Figure 1:
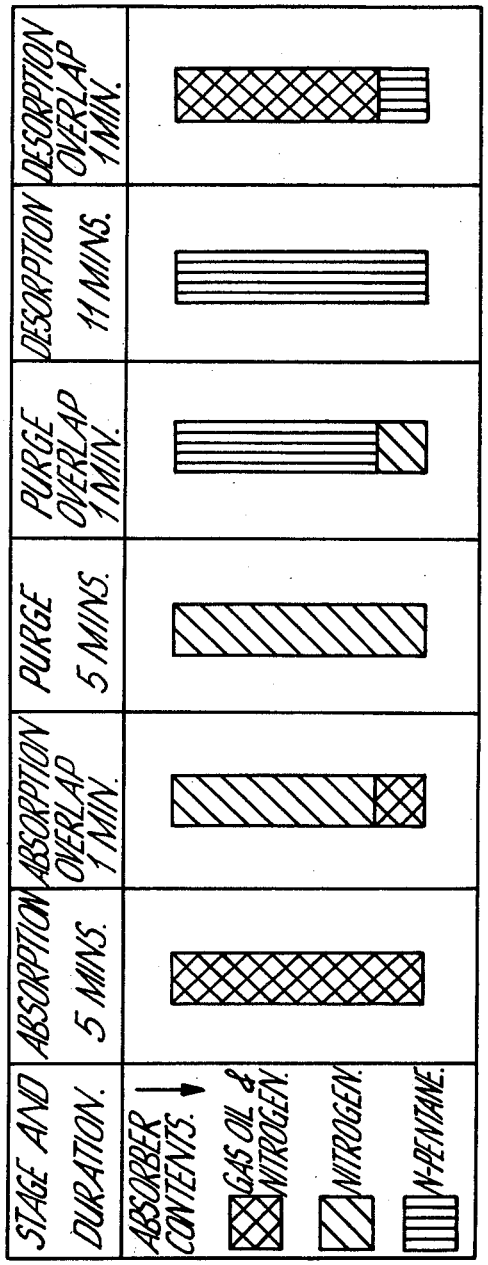

3,184,406
SEPARATION PROCESSES
Alan Arthur Yeo and Roger Templeton Lewis Mowll, Sunbury-on-Thames, England, assignors to The British Petroleum Company Limited, London, England, a British joint-stock corporation
Filed Nov. 1, 1962, Ser. No. 234,720
Claims priority, application Great Britain, Nov. 3, 1961, 39,433/61
7 Claims. (Cl. 208—310)

This invention relates to cyclic separation processes of the absorption-desorption type using a fixed bed of absorbent and particularly to such processes which employ molecular sieve absorbents.

It is well known that certain natural and synthetic zeolites have the property of preferentially absorbing certain types of hydrocarbons. These zeolites, known as molecular sieves, have crystalline structures containing a large number of pores of uniform size. In different zeolite these pores may vary from 4 A. to 15 A. or more in diameter, but in any one zeolite the pores will be of substantially uniform size.

It has previously been proposed to treat hydrocarbon mixtures with molecular sieves, for example it has been proposed to treat petroleum fractions with a 5 A. molecular sieve to separate straight-chain hydrocarbons from branched-chain and/or cyclic hydrocarbons. Such a process may be used to recover a denormalised fraction, for example gasoline of higher octane number due to the removal of low octane normal paraffins. The absorbed straight-chain material may also be recovered as a product if desired. Such processes are generally cyclic in operation, involving absorption and desorption stages. An intermediate purge stage may also be employed if desired.

In a cyclic process using one or more fixed beds of absorbent it is necessary for each bed to have two or more feedstock supply lines with one or more inlet valves which are switched to change periodically the feedstock passing into the bed. Similarly the bed has two or more effluent removal lines with one or more outlet valves which are switched to divert periodically the effluent from one removal line to another.

According to the present invention, in a cyclic absorption-desorption process using one or more fixed beds of a solid absorbent, the switching of the outlet valves from the absorbent beds is delayed beyond the switching of the inlet valves so that the material present in the voids between the absorbent particles when the inlet valves are switched is removed from the absorber before the oulet valves are switched in an amount of up to 90% and preferably between 50 and 90%.

In cyclic processes it is generally suggested that the inlet and outlet valves be switched simultaneously. This leads, in certain cases, to material being passed into the wrong effluent stream. This is particularly undesirable where relatively short cycle times are employed, when the quantity of effluent from each stage is relatively small and the amount of material therein which should have been passed to another effluent stream is proportionately large. For example, in a process for the separation and recovery of n-paraffins from a petroleum distillate fraction comprising absorption, purge and desorption stages in which the inlet and outlet valves are switched simultaneously, the situations at the change-over periods are as follows:

(a) *Desorption to absorption.*—The sieve bed contains desorbing medium together with some n-paraffins. As the fresh feedstock advances through the sieve bed, this desorbing medium together with the n-paraffins will pass into the effluent from the absorption stage, which should contain only non-normal hydrocarbons. Where the n-paraffins are required as a desirable product, this represents a loss of n-paraffins; where a stream free from n-paraffins is required it represents appreciable contamination.

(b) *Absorption to purging.*—The voids between sieve particles contain both straight-chain and non-straight-chain material from the original feedstock and this will pass, with the purging medium, into the effluent from the purge stage. The quantity of purge effluent is, however, greater than need be and a reduction in the quantity of purge effluent would mean that the facilities for separating hydrocarbon material from purging medium need not be so large and also that the quantity of hydrocarbon material recycled to the feedstock would be less.

(c) *Purging to desroption.*—The voids between sieve particles contain purging medium which will pass, with the desorbed n-paraffins, into the effluent from the desorption stage. Although the purging medium is readily separable from the desorbate, more purging medium than strictly necessary must be used.

It is seen that certain inconveniences arise in each of the three stages but clearly the main problem arises during the changeover from desorption to absorption, and the overlap in this operation is the critical one. Preferably, however, although not essentially, the overlap in the other changeovers is the same as that during the desorption to obsorption change so as to preserve continuity of flow in incoming and outgoing streams. Although the optimum overlap period for the desorption to absorption change will not necessarily be the optimum for the other changes, even in these other changes the overlap will have some beneficial effect.

By operating the present invention, therefore, the effect is to decrease the n-paraffin content of the non-absorbed material, i.e. to increase the extraction efficiency of the process.

The method of the present invention is particularly suited to processes employing molecular sieve absorbents and especially to such processes treating petroleum distillate fractions boiling in the naphtha and gas-oil ranges, i.e. $C_4$–200° C. and 200–400° C. respectively, with a 5 A. molecular sieve. The method may be operated in either the liquid or the vapour phase and is preferably isothermal and isobaric. Suitable process conditions include a temperature within the range 200–600° C., preferably 300–450° C., and a pressure within the range 0–500 p.s.i.g., preferably 100–300 p.s.i.g. Any suitable purging and desorbing agents may be used but the preferred purging agent is an inert gas, for example nitrogen, and the preferred desorbing agent is one or more n-paraffins boiling below the initial boiling point of the feedstock, for example n-butane or n-pentane. Preferably a suitable diluent is introduced with the feedstock to the absorption stage, for example nitrogen which may conveniently be recycled from the purge stage.

It is believed that the incoming feed advances along the sieve bed in the form of a front between the feed and the outgoing material. The rate at which this front advances along the sieve bed can be predicted for given conditions, but as the front is believed to be diffused to some extent, a safety factor is preferably included in the prediction to guard against the accidental discharge of material into the wrong effluent. A 10% safety factor has been found to be satisfactory. The duration of overlap necessary to allow removal of 90% of outgoing material may be obtained in the case of vapour phase operation by the formula $$\frac{KPvAh}{90T(ac+bc')} \text{ secs.}$$

and in the case of liquid phase operation by the formula $KvAh/S$ secs. where

T is the temperature of the sieve bed in ° K.
a is the number of moles of feed fed per second
b is the number of moles of diluent fed per second
c is the compressibility factor of the feed at the operating conditions
c' is the compressibility factor of the diluent at the operating conditions
v is the void fraction of the absorber
A is the internal cross-sectional area of the absorber in cm.$^2$
h is the weight of the absorbent bed in cm.
P is the pressure in atmospheres absolute
S is the space velocity in v./v./hr. based on total packed volume.
K is a factor having a value between 1.0 and 2.0 depending upon the exact conditions of the process.

The variables can be readily determined but, in the case of petroleum feedstocks, a mean molecular weight must be determined. The error introduced by this value is, however, small and is compensated for in the above-mentioned safety factor of 10%.

The factor K takes into account the tendency of non-straight-chain hydrocarbons to be adsorbed on the surface of the molecular sieve during the changeover from desorption to adsorption. The extent of this adsorption may be considerable and varies according to the nature of the hydrocarbon feedstock being treated, the type of zeolite and the type of binder employed, and the physical dimensions of the adsorbent bed. The factor K can be determined experimentally for any individual set of circumstances and may have a value between 1.0 and 2.0. The effect of this surface adsorption is to delay the passage of the front of non-normal hydrocarbons along the sieve bed. By assuming K to have a value of 1.0 some advantage will always be obtained according to the present invention and there will be no danger of allowing the overlap period to be extended too far. However, K will generally be greater than 1.0 so that the overlap may be extended considerably without causing non-normal hydrocarbons to appear in the n-paraffinic effluent from the desorption stage.

The operation of the present invention is illustrated in the accompanying FIG. 1.

FIG. 1 represents the position at various times in one of the sieve beds of a multi-absorber process for the separation of n-paraffins from a gas-oil fraction using nitrogen as feed diluent and purging medium and n-pentane as desorbing agent.

The operation of the present invention is illustrated in the accompanying FIG. 1.

FIG. 1 represents the position at various times in one of the sieve beds of a multi-absorber process for the separation of n-paraffins from a gas-oil fraction using nitrogen as feed diluent and purging medium and n-pentane as desorbing agent.

The invention is further illustrated by the following examples:

EXAMPLE 1

A 220–350° C. gas oil hydrofined to a sulfur content of 0.01% weight was treated in a 5.3 litre capacity absorber charged with 4.0 litres of a commercial 5 A. molecular sieve at 380° C. and 125 p.s.i.g. The operational sequence is indicated in the following Table 1:

Table 1

| Cycle | Feed and space velocity | Period, mins. |
|---|---|---|
| Absorption | Gas-oil at 0.68 LHSV + nitrogen at 120 GHSV. | 6 |
| Purge | Nitrogen at 120 GHSV | 6 |
| Desorption | n-Pentane at 1.0 LHSV | 12 |

Without overlapping the valve operation, a n-paraffin yield of 1.01% sieve weight per cycle was obtained. From the above formula, assuming K to have a value of 1.0, it was calculated that, to remove 90% of the material in the voids between sieve particles, an overlap of 1.5 minutes was required. With an overlap of 1.5 minutes a n-paraffin yield of 1.13% sieve weight per cycle and of 95% purity was obtained, i.e. an increase of 12%.

EXAMPLE 2

The gas-oil of Example 1 was treated in a 40 litre capacity absorber containing a commercial 5 A. molecular sieve at 350° C. and 125 p.s.i.g.

The operational sequence is indicated in the following Table 2:

Table 2

| Cycle | Feed and space velocity | Period, mins. |
|---|---|---|
| Absorption | Gas-oil at 0.68 LHSV + nitrogen at 120 GHSV. | 6 |
| Purge | Nitrogen at 120 GHSV | 6 |
| Desorption | n-Pentane at 1.0 LHSV | 12 |

Without overlapping, a n-paraffin yield of 1.35% sieve weight per cycle was obtained. From the above formula, assuming K to have a value of 1.0, it was calculated that, to remove 90% of the material in the voids between sieve particles, an overlap of 45 seconds was required. With an overlap of 45 seconds a n-paraffin yield of 1.5% sieve weight per cycle and of 95% purity was obtained, i.e. an increase of 11%.

EXAMPLE 3

A 250–290° C. gas oil was treated in a multiple (4) absorber plant, each absorber having a capacity of 4.6 litres, each absorber charged with a commercial 5 A. sieve, at a temperature of 380° C. and a pressure of 125 p.s.i.g. The operational sequence is indicated in the following Table 3:

Table 3

| Cycle | Feed and space velocity | Period, mins. |
|---|---|---|
| Absorption | Gas-oil at 0.68 LHSV + nitrogen at 120 GHSV. | 6 |
| Purge | Nitrogen at 120 GHSV | 6 |
| Desorption | n-Pentane at 1.0 LHSV | 12 |

From the above formula, assuming K to have a value of 1.0, it was calculated that, to remove 90% of the material in the voids between sieve particle, an overlap of 45 seconds was required. However, K was found experimentally to have a value of 1.67 so that, in fact, the overlap could be extended to 75 seconds without any non-normal hydrocarbons appearing in the n-paraffinic effluent. However, in order to obtain the optimum yield, an overlap of 50 seconds was employed and a yield of 3.75% sieve weight per hour of n-paraffins was obtained in a purity of 97%.

Figure 2:
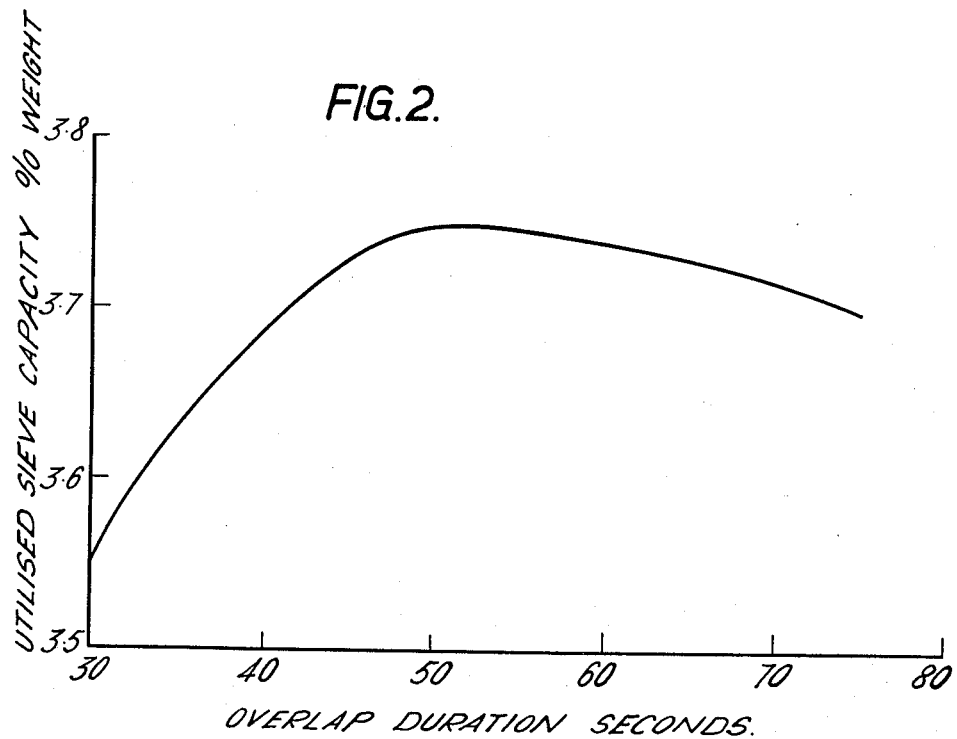

The relation between the utilised sieve capacity per hour and overlap time is shown in the accompanying graph, FIG. 2.

We claim:

1. A three stage absorption-purge-desorption process operated isothermally and isobarically in the vapor phase at a temperature in the range of 200–600° C. and a pressure within the range of 0–500 p.s.i.g. on a petroleum fraction feedstock boiling in the range $C_4$–400° C., said process using at least one fixed bed of a 5 A. molecular sieve absorbent, each bed having at least two inlet lines and at least two outlet lines, each line having at least one valve, the valves in the inlet lines being switched periodically to change the feedstock passing into the absorbent bed and the valves in the outlet lines being switched periodically to divert the effluent passing out of the absorbent bed from one outlet line to another and wherein during the changeover from desorption to absorption, the switching of the outlet valves is delayed beyond the switching of the inlet valves to an extent until 50 to 90% of the material present in the voids between absorbent particles when the inlet valves are switched is removed from the absorber before the outlet valves are switched and during all other changeovers the switching of the outlet valves is delayed for the same period as during the changeover from desorption to absorption, the purging medium employed in the purge step being an inert gas and at least one n-paraffin boiling below the initial boiling point of the feedstock being employed as desorbing medium.

2. A process as claimed in claim 1 wherein four beds of absorbent are employed so that at any given time one bed is absorbing, one bed is being purged and two beds are being desorbed.

3. A process as claimed in claim 1 which is operated at a temperature within the range 300–450° C. and a pressure within the range 100–300 p.s.i.g.

4. A process as claimed in claim 1 wherein nitrogen is employed as purging medium.

5. A process as claimed in claim 1 wherein the desorbing medium is selected from the group comprising n-pentane and n-butane.

6. A process as claimed in claim 1 wherein a diluent is introduced with the fedestock to the absorption stage.

7. A process as claimed in claim 6 wherein the diluent is nitrogen.

References Cited by the Examiner
UNITED STATES PATENTS

| | | | |
|---|---|---|---|
| 2,859,256 | 11/58 | Hess et al. | 260—676 |
| 2,952,630 | 9/60 | Eggertsen et al. | 260—676 |
| 2,963,519 | 12/60 | Kasperik et al. | 260—676 |
| 3,054,838 | 9/62 | Egan | 260—676 |

ALPHONSO D. SULLIVAN, *Primary Examiner.*